United States Patent [19]
Bates et al.

[11] Patent Number: 5,561,004
[45] Date of Patent: Oct. 1, 1996

[54] PACKAGING MATERIAL FOR THIN FILM LITHIUM BATTERIES

[76] Inventors: John B. Bates, 116 Baltimore Dr., Oak Ridge, Tenn. 37830; Nancy J. Dudney, 11634 S. Monticello Rd., Knoxville, Tenn. 37922; Kim A. Weatherspoon, 223 Wadsworth Pl., Oak Ridge, Tenn. 37830

[21] Appl. No.: 202,649

[22] Filed: Feb. 25, 1994

[51] Int. Cl.$^6$ .................................................. H01M 2/08
[52] U.S. Cl. ....................... 429/162; 429/163; 429/177; 429/185
[58] Field of Search ........................ 429/163, 162, 429/177, 185

[56] References Cited

U.S. PATENT DOCUMENTS

| | | |
|---|---|---|
| 4,432,891 | 2/1984 | Susman et al. |
| 4,503,133 | 3/1985 | van Lier et al. ............... 429/174 |
| 4,548,880 | 10/1985 | Suzuki et al. ............... 429/185 X |
| 4,764,438 | 8/1988 | Vaughn et al. |
| 5,141,614 | 8/1992 | Akridge et al. |
| 5,326,652 | 7/1994 | Lake ............................ 429/177 X |
| 5,338,625 | 8/1994 | Bates et al. ............... 429/193 |
| 5,378,557 | 1/1995 | Murata et al. ............... 429/185 X |

OTHER PUBLICATIONS

Product information literature relating to parylene from the Union Carbide Company. (no date).

M. A. Spivak "Reaction of Parylene C Coated Lithium with Water Vapor" *Corrosion–Nace*, vol. 26, No. 9, Sep. 1970. pp. 371–376.

D. S. Rajoria and J. P. deNeufVille, "Improved Coatings for Lithium Anodes" source not available. (no date).

F. K. Shokoohi and J. M. Tarascon, "Solid State Thin Film $LiMn_2O_4/Li$ Rechargeable Batteries" fr. Electrochemical Society Inc publ. Nov. 1992.

J. R. Akridge and Harry Vourlies, "Solid State Batteries Using Vitreous Solid Electrolytes" Solid State Ionics 18 & 19 (1986) pp. 1082–1087.

*Primary Examiner*—John S. Maples
*Attorney, Agent, or Firm*—Michael E. McKee; J. Donald Griffin; H. W. Adams

[57] ABSTRACT

A thin film battery including components which are capable of reacting upon exposure to air and water vapor incorporates a packaging system which provides a barrier against the penetration of air and water vapor. The packaging system includes a protective sheath overlying and coating the battery components and can be comprised of an overlayer including metal, ceramic, a ceramic-metal combination, a parylene-metal combination, a parylene-ceramic combination or a parylene-metal-ceramic combination.

29 Claims, 2 Drawing Sheets

5,561,004

PACKAGING MATERIAL FOR THIN FILM LITHIUM BATTERIES

BACKGROUND OF THE INVENTION

This invention relates generally to thin film battery construction and relates, more specifically, to means and methods by which thin film batteries are protected.

The metal lithium reacts rapidly upon exposure to atmospheric elements such as oxygen, nitrogen, carbon dioxide and water vapor. Thus, the lithium anode of a thin film battery will react in an undesirable manner upon exposure to such elements if the anode is not suitably protected. Other components of a thin film battery, such as a lithium electrolyte and cathode films, also require protection from exposure to air although these components are commonly not as reactive as thin metal anode films. It would therefore be desirable to incorporate within a lithium battery, which includes an anode of lithium and other air-reactive components, a packaging system that satisfactorily protects the battery components from exposure to air.

Accordingly, it is an object of the present invention to provide new and improved means for protecting components of a thin film battery from atmospheric elements such as air and water vapor.

Another object of the present invention is to provide such protecting means which is in the form of a packaging system for thin film lithium batteries.

SUMMARY OF THE INVENTION

This invention resides in a thin film battery including components which are capable of reacting upon exposure to air and water vapor.

The improvement comprises a protective sheath overlying and coating the battery components so that the sheath provides a barrier against the penetration of air and water vapor.

The protective sheath may be comprised of an overlayer including metal, ceramic, a ceramic-metal combination, a parylene-metal combination, a parylene-ceramic combination, or a parylene-metal-ceramic combination.

DETAILED DESCRIPTION OF THE ILLUSTRATIVE EMBODIMENTS

Figure 1:
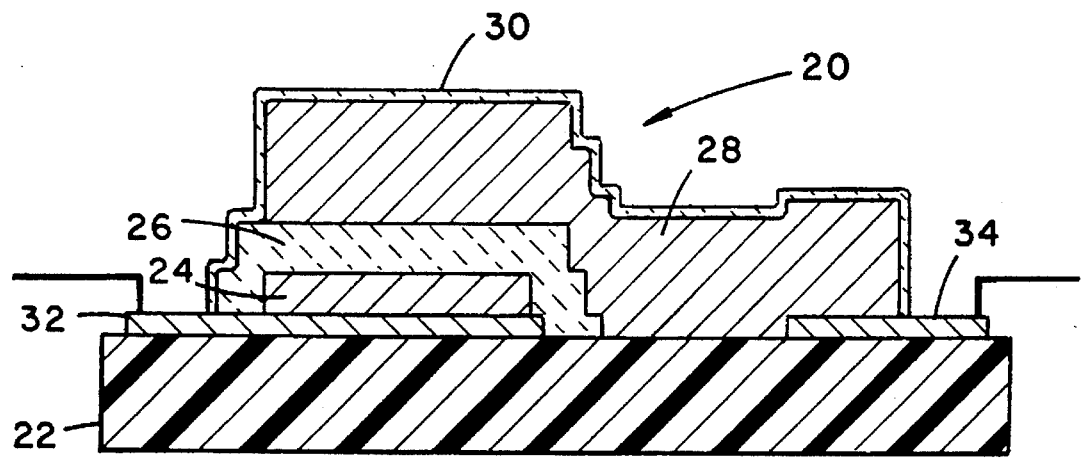
FIG. 1 is a schematic cross sectional view of a thin film battery within which a packaging system is utilized.
Figure 2:
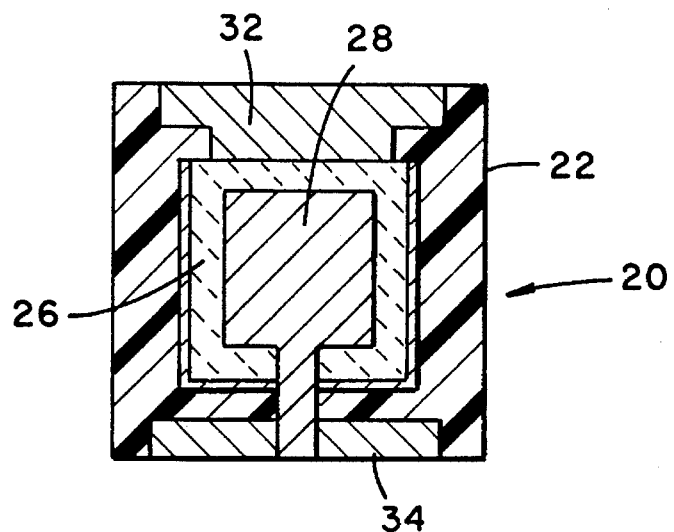
FIG. 2 is a top plan view of the FIG. 1 battery.

Turning now to the drawings in greater detail, there is illustrated in FIGS. 1 and 2 a thin film battery, generally indicated 20, which incorporates a packaging system in accordance with the present invention. The battery 20 includes components which have been fabricated, or built up, onto a substrate 22. More specifically, the battery 20 includes a cathode 24, an electrolyte 26 and an anode 28 wherein each component is provided by a film deposited in a predetermined fashion upon the substrate 22. It is a feature of the battery 20 that its packaging system is in the form of a protective sheath 30 which overlies and coats the cathode, electrolyte and anode films of the battery so that the sheath provides a barrier against the penetration of air and water vapor.

The substrate 22 underlying the battery 20 may be comprised of glass, alumina, sapphire or various semiconductor or polymer materials. To enable electrical power to be withdrawn from the battery 20, two current collector films 32 and 34 are deposited upon the substrate 22, and then the cathode film 24 is deposited upon the collector 32. The current collector films 32 and 34 of the depicted battery 20 are separated from one another as shown in FIG. 1, and the first collector film 32 is slightly larger in area (when viewed in plan) than that of the second collector 34.

The electrolyte film 26 is deposited in place so as to cover the cathode film 24, and at least a portion of the first collector 32 and a section of the substrate 22 is disposed between the first and second collector films 32 and 34. The electrolyte 26 is an amorphous lithium phosphorus oxynitride having the composition $Li_xPO_yN_z$. The anode 28 (which has about the same geometric configuration as that of the cathode 24) is comprised of lithium and is deposited upon the previously-formed films 24, 26 and 28 so as to directly overlie a substantial portion of the electrolyte 26 and a portion of the second collector film 34.

The film components 22, 24, 26 and 28 correspond with those of a thin-film battery described in greater detail in pending U.S. patent application Ser. No. 07/921,538, filed Jul. 29, 1992. Accordingly, for a more detailed description of the components of the battery 20 and/or the composition thereof, reference can be had to the referenced application Ser. No. 07/921,538, whose disclosure is incorporated herein by reference.

The protective shield 30 overlies and covers the entire surface area of the battery films 26 and 28 which would otherwise be left exposed to the atmosphere. In addition, the shield 30 is advantageous in that it acts as an impermeable barrier through which air (or its gaseous constituents) and water vapor cannot penetrate. Such an advantage can be readily appreciated in connection with the component films, i.e. the electrolyte film 26 and the anode film 28, which include an amount of lithium which, as mentioned earlier, is highly reactive to atmospheric elements.

Figure 4:
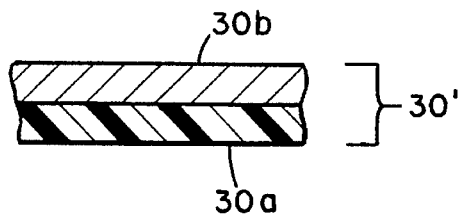
FIG. 4 is a cross-sectional view of a fragment of an exemplary protective coating of the present invention.

In accordance with the broader aspects of the present invention, the shield 30 may be comprised of a ceramic layer, a metal layer, a combination of a metal and ceramic layers, a parylene and metal overlayers or various combinations of the foregoing layers (see for example, the protective layer 30' of FIG. 4 comprised of a layer 30a of parylene overlain by a layer 30b of metal). It will be understood, however, that if the layer closest to the underlying anode and cathode films 28 and 24 is to be metal, an insulative substance must be deposited upon the anode and/or cathode film (or other suitable provisions taken) to prevent the metal overlayer from directly contacting both the anode and cathode. Otherwise, the battery would short through the metal.

It will also be understood that in the interests of the present invention, a combination of materials as used to describe the composition of a protective coating, or shield, such as for example in a description of an overlayer (or protective coating) including a ceramic-metal combination or including a parylene-metal combination, is used to define a multi-layer arrangement of materials within the overlayer. For example, an overlayer (or protective coating) which includes a ceramic-metal combination includes a multi-layer arrangement comprised of at least one layer of metal and at least one layer of ceramic arranged in superposed relationship with the metal layer. It follows that a ceramic-metal combination can include a multi-layer arrangement comprised of a stacked arrangement of ceramic layers and metal layers wherein each metal layer is sandwiched between two ceramic layers within the stack.

Similarly, an overlayer (or protective coating) which includes a parylene-metal combination includes a multi-layer arrangement comprised of at least one layer of metal and at least one layer of parylene arranged in superposed relationship with the metal layer. An example of parylene-metal overlayer coating a battery may have the following construction: P/M/P/M/P/Li/Lipon/$V_2O_5$/V/S wherein S is the substrate, Li is the lithium anode layer, P is parylene and M is metal. In the foregoing example, the parylene and metal layers alternate with one another as a path is traced through a cross section of the coating. Further still, an overlayer which includes a parylene-metal-ceramic combination includes a multi-layer arrangement comprised of at least one layer of ceramic, at least one layer of metal and at least one layer of parylene arranged in a multi-layer or stacked relationship.

When the shield 30 is comprised of metal alone, the metal chosen as the shield must be one which does not alloy with lithium, such as chromium, nickel, vanadium or manganese. In order to cover the lithium anode film 28 with an overlayer of one of these metals, it is desirable to achieve a smooth, pore-free texture on the exposed surface of the lithium. Such smooth Li films have been obtained by rolling the already-deposited lithium film with a quartz cylinder, i.e. mechanical smoothing, or depositing the lithium film onto a surface cooled to below −70° C. A preferred method for obtaining a smooth Li film involves the depositing of the lithium film onto a surface at a relatively fast rate, i.e. at about 40 Å/sec.

A ceramic overlayer comprising the shield 30 has been found, through experiment, to provide adequate protection for the underlying battery components 24, 26 and 28. Such tests were conducted with lithium phosphorus oxynitride, a ceramic developed at the Oak Ridge National Laboratory and available under the trade designation Lipon, which was deposited upon lithium films. In one set of tests, the lithium phosphorus oxynitride was deposited by rf magnetron sputtering over a mechanically smoothed lithium film. In particular, a Li film deposited onto Lipon/S was mechanically smoothed by rolling a glass rod over the film and then covered with about 0.7 μm of Lipon. The deposition rate was about 10 Å/min and the deposition time was about 13 h. Some areas of the Li were dark in appearance after coverage, thus suggesting that a reaction had occurred during deposition. Other regions of the Li film appeared unchanged. Along the same lines, a multilayer test structure including the sequential layers of Lipon, Li and Lipon deposited upon a substrate (wherein such a structure is designated as a Lipon/Li/Lipon/S test structure) was monitored as a function of exposure time. Some regions of the Li film in this latter test structure darkened a few hours after exposure, thus indicating reaction with air, but a significant area of the film remained unchanged after exposure for six days.

In another set of tests, a thin film of lithium orthophosphate was deposited over lithium films by electron beam evaporation of $Li_3PO_4$. In particular, two specimens, Li/Lipon/S and Li/Lipon/polyester, were covered with about 0.5 μm of a film deposited by e-beam evaporation of $Li_3PO_4$. The deposition rates were about 480 Å/min, respectively. The lithium films in both cases appeared unchanged after coverage. On exposing the $Li_3PO_4$/Li/Lipon/S specimen to air, the Li turned uniformly white after 10 minutes, thus indicating complete reaction. Subsequent SEM examination revealed several large (~20 μm) particles of $Li_3PO_4$ on the surface, possibly due to "spitting" from the source, around which the film had cracked. Otherwise, the evaporated film was smooth and free of cracks. It is believed that reaction occurred by air diffusing through the cracks around the large particles. No change was observed in the Li film of the specimen on polyester after 60 min of exposure, but complete reaction of the lithium had occurred after three hours of exposure.

Although less-than-optimum results were obtained by the tests conducted on the use of ceramic (alone) as the battery shield 30, the tests do support the conclusion that the ceramic overlayer afforded some protection of the lithium films to air.

In a preferred embodiment of the shield 30, the shield includes a layer of parylene, a generic name used for members of a unique polymer series developed by the Union Carbide Corporation. Parylene is a well-known conformal coating that provides a diffusion barrier to air and water vapor. Because the top surface of as-deposited Li films may be rough and porous (depending upon the way that the lithium is deposited), a nonreactive conformal coating, which can penetrate these pores and coat rough features uniformly, is advantageous in this respect.

During tests, a Li/Lipon/S test specimen and a Li/Lipon/$V_2O_5$/V thin-film cell were coated with about 5 μm of parylene. The resistance and reflectivity of the test specimen and the open circuit voltage of the thin-film cell were measured as a function of exposure time. Degradation of the coated lithium film was noted after about 50 hr in both cases. This is about 100 times faster than expected, based on the measured diffusion coefficients of air and water vapor through parylene. It is believed that pores present in the parylene film were responsible for the rapid transport of air and/of water vapor to the lithium films.

Figure 3:
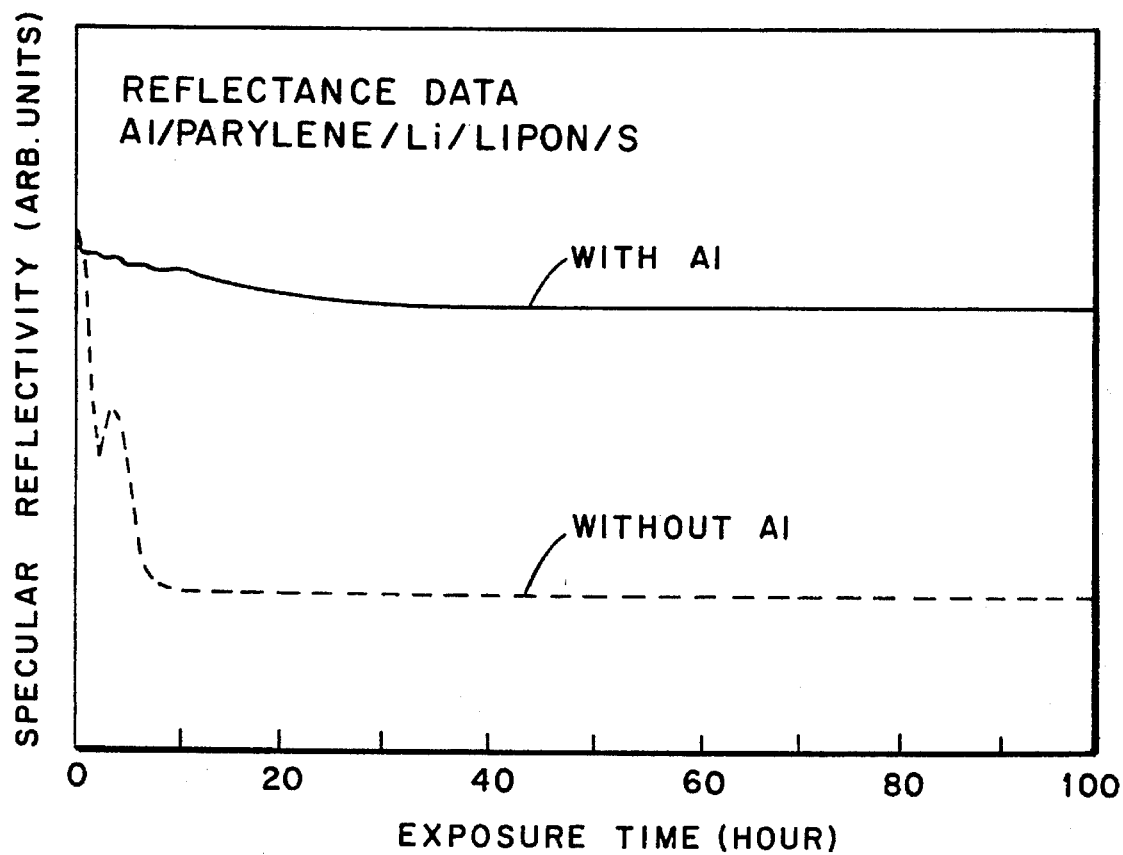
FIG. 3 is a graph providing specular reflection from an Li/Lipon interface for coverage of Li with parylene alone and with aluminum over parylene.

A second test specimen was coated with 5 μm of parylene, and then an 0.1 μm aluminum film was deposited over the parylene by sputtering techniques. The Al overlapped the underlying Li film by about 50% but did not overlap the parylene which covered the entire surface of the specimen. The lithium film of this specimen remained essentially unchanged over more than 90% of its area after more than several months of exposure to air. For the first three weeks (of the four week period), reaction was noticeable only around the edges of the Li film. After four weeks, some reaction near the center of the film became evident. Graphs of the specular reflectivity from the Li/Lipon interface for the parylene-coated and the Al-parylene coated films are compared in FIG. 3. These results suggest that the thin Al film acted as a barrier against air and water vapor and that the attack of the Li occurred by lateral diffusion through the parylene from the edge of the Al film.

As a test of the ultimate practicality of packaging thin film lithium batteries with a multilayer coating including at least one layer of parylene, a two-cell rechargeable thin-film lithium battery was fabricated and tested. The battery had the following construction: P/Li/Lipon/$V_2O_5$/V/P/Li/Lipon/$V_2O_5$/V/S wherein P is parylene, Lipon is the oxynitride electrolyte, and S is the substrate. The parylene film was trimmed away from the intermediate V current collector so that the top and bottom cells could be monitored and cycled separately. The battery has undergone a number of charge-discharge cycles with no indication of any degradation in performance compared to other single-cell laboratory batteries without parylene coating of the lithium anode. In addition, several single-cell batteries that were either covered with parylene or were overlain with layers of parylene and metal, e.g. a parylene-metal combination having, for example, the construction P/M/P/M/P/Li/Lipon/V$_2$O$_5$/V/S, which experienced no degradation of the lithium anode and no changes in their cycling behavior compared to uncoated cells. These results indicate that it is possible to coat lithium anode films as well as the entire thin film battery with any combination of metal and/or ceramic films, including semiconductors, provided that the lithium is first covered with a layer of parylene. It is believed that multiple parylene/metal overlayers, wherein the parylene is about 500 nm thick and the metal is about 50 nm thick is a practical composition of the shield 30, and that any metal that can be deposited as a film by sputtering or evaporation can be used for this purpose.

The films and layers of the aforedescribed test structures were examined in optical and scanning electron microscopes before and after exposure to air. In some experiments, the specular reflectivity of the Li/Lipon interface was measured with a He-Ne laser and the resistance of the Li film deposited across two contacts were monitored continuously as a function of exposure time.

When the shield-covered batteries described herein are installed in a device by a manufacturer for subsequent sale or use, it is preferable that the shield-covered batteries be covered or coated with a layer of ultraviolet-cured (UV-cured) epoxy as a further measure of protection for the batteries. In other words, the UV-cured epoxy overlayer would further reduce the speed at which the battery is degraded by atmospheric elements. An epoxy of this type is advantageous for this purpose in that it does not shrink or swell during its curing stages, and an example of such an epoxy is available under the trade designation Lightfast 280 from Microlight Technology of Mesa, Ariz.

It will be understood that numerous modifications and substitutions can be had to the aforedescribed embodiments without departing from the spirit of the invention. Accordingly, the aforedescribed embodiments are intended for the purpose of illustration and not as limitation.

We claim:

1. In a thin film battery including a thin film-deposited lithium anode which is capable of reacting upon exposure to air and water vapor, the improvement comprising:

a thin film-deposited protective sheath overlying and directly contacting the lithium anode of the battery so that every surface region of the lithium anode which is not contacted by another component of the thin-film battery is coated by the protective sheath so that the sheath provides a thin film barrier coating against the penetration of air and water vapor to the lithium anode.

2. The improvement as defined in claim 1 wherein said protective sheath includes a material selected from the group consisting of ceramic and parylene.

3. The improvement as defined in claim 1 wherein said protective sheath includes an overlayer selected from the group consisting of a metal overlayer, a ceramic overlayer, a ceramic-metal overlayer, a parylene-metal overlayer, a parylene-ceramic overlayer and a parylene-metal-ceramic overlayer.

4. The improvement as defined in claim 3 wherein the overlayer is a metal overlayer, and the metal of the overlayer does not alloy with lithium when placed in contact therewith.

5. The improvement as defined in claim 4 wherein the metal of the overlayer is chosen from a group consisting of chromium, iron, titanium, nickel, vanadium and manganese.

6. The improvement as defined in claim 3 wherein the overlayer is a ceramic overlayer, and the ceramic of the overlayer is lithium phosphorus oxynitride.

7. The improvement as defined in claim 2 wherein the sheath includes a layer of parylene which is in direct contact with at least one component of the battery.

8. The improvement as defined in claim 7 wherein the layer of parylene is a first layer and the sheath includes a second layer including material chosen from a group consisting of metal, ceramic and a metal-ceramic combination and wherein the second layer overlies the first layer.

9. The improvement as defined in claim 8 wherein the material of the second layer is metal and the metal of the second layer is selected from the group consisting of aluminum, titanium, vanadium, chromium and manganese.

10. The improvement as defined in claim 8 wherein the second layer is comprised of metal and the thickness of the first layer is at least about 500 nm and the thickness of the second layer is at least about 50 nm.

11. The improvement as defined in claim 8 wherein the first and second layers comprise a first upon the battery components and the sheath includes at least one additional laminate buildup overlying the first laminate buildup wherein each additional laminate buildup includes a layer of parylene and a layer of material chosen from a group consisting of metal, ceramic and a metal-ceramic combination.

12. The improvement as defined in claim 11 wherein each of the second and fourth layers is comprised of metal and the thickness of each of the first and third layers is at least about 500 nm and the thickness of each of the second and fourth layers is at least about 50 nm.

13. The improvement as defined in claim 1 further comprising a coating of ultraviolet-cured epoxy overlying the protective sheath.

14. An improved thin-film, electrochemical cell comprising:

a) a substrate;

b) a first conductive film and a second electrically conductive film which are each deposited on the surface of said substrate and in a spaced horizontal relationship from one another;

c) a third film of electrically conductive cathode material deposited over said first film;

d) a fourth film of an electrolyte having nitrogen contained therein deposited on and overlapping said third film to extend upon said first film and to partially extend upon a section of said substrate which separates said first and second films;

e) a fifth film of electrically conductive anode material deposited over the remainder of said substrate separating said first and second films and over a portion of each of said second and fourth films; and f) a thin film-deposited outer sheath of a thin film protective coating which overlies and coats the films and which is nonreactive with said fifth film and provides a barrier against the penetration of air and water vapor.

15. The cell as defined in claim 14 wherein said protective coating includes a material selected from the group of metal, ceramic and parylene.

16. The cell as defined in claim 14 wherein said protective coating includes an overlayer selected from the group consisting of a metal overlayer, a ceramic overlayer, a ceramic-metal overlayer, a parylene-metal overlayer, a parylene-ceramic overlayer and a parylene-metal-ceramic overlayer.

17. The cell as defined in claim 16 wherein the metal of the overlayer is chosen from a group consisting of chromium, iron, titanium, nickel, vanadium and manganese.

18. The cell as defined in claim 16 wherein the overlayer is a ceramic overlayer, and the ceramic of the overlayer is one of a metal nitride and a metal oxide.

19. The cell as defined in claim 15 wherein the coating includes a layer of parylene which is in direct contact with at least one component of the battery.

20. The cell as defined in claim 18 wherein the layer of parylene is a first layer and the coating includes a second layer including material chosen from a group consisting of metal and ceramic and wherein the second layer overlies the first layer.

21. The cell as defined in claim 20 wherein the material of the second layer is metal, and the metal of the second layer is selected from the group consisting of aluminum, titanium, vanadium, chromium and manganese.

22. The cell as defined in claim 14 wherein the outer coating includes overlayers which are selected from the group consisting of metal overlayers, ceramic overlayers, ceramic-metal overlayers, parylene-metal overlayers, parylene-ceramic overlayers and parylene-metal-ceramic overlayers.

23. The cell as defined in claim 14 further comprising a coating of ultraviolet-cured epoxy overlying the outer sheath.

24. In a thin film battery including components which are capable of reacting upon exposure to air and water vapor, the improvement comprising:

a thin film-deposited protective sheath overlying and coating the battery components so that the sheath provides a thin film barrier against the penetration of air and water vapor wherein the protective sheath includes a layer of parylene which is in direct contact with at least one component of the battery, and the layer of parylene is a first layer and the sheath includes a second layer including material chosen from a group consisting of metal, ceramic and a metal-ceramic combination and wherein the second layer overlies the first layer.

25. The improvement as defined in claim 24 wherein the material of the second layer is metal and the metal of the second layer is selected from the group consisting of aluminum, titanium, vanadium, chromium and manganese.

26. The improvement as defined in claim 24 wherein the second layer is comprised of metal and the thickness of the first layer is at least about 500 nm and the thickness of the second layer is at least about 50 nm.

27. The improvement as defined in claim 24 wherein the first and second layers comprise a first laminate buildup upon the battery components and the sheath includes at least one additional laminate buildup overlying the first laminate buildup wherein each additional laminate buildup includes a layer of parylene and a layer of material chosen from a group consisting of metal, ceramic and a metal-ceramic combination.

28. The improvement as defined in claim 27 wherein each of the second and fourth layers is comprised of metal and the thickness of the first and third layers is at least about 500 nm and the thickness of each of the second and fourth layers is at least about 50 nm.

29. In a thin film battery including components which are capable of reacting upon exposure to air and water vapor, the improvement comprising:

a thin film-deposited protective sheath overlying and coating the battery components so that the sheath provides a thin film barrier against the penetration of air and water vapor; and a coating of ultraviolet-cured epoxy overlying the protective sheath.

* * * * *

UNITED STATES PATENT AND TRADEMARK OFFICE
CERTIFICATE OF CORRECTION

PATENT NO. : 5,561,004
DATED : October 1, 1996
INVENTOR(S) : John B. Bates, Nancy J. Dudney and
Kim A. Weatherspoon It is certified that error appears in the above-indentified patent and that said Letters Patent is hereby corrected as shown below:

Column 1, between the title (ending on line 2) and the
heading "Background of the Invention" on line 4
should appear the following paragraph:
--This invention was made with Government support
under Contract No. DE-AC05-84OR21400 awarded by the U.S.
Department of Energy to Martin Marietta Energy Systems,
Inc. The Government has certain rights in this
invention.--

Signed and Sealed this

Twenty-ninth Day of April, 1997

Attest:

BRUCE LEHMAN

Attesting Officer

Commissioner of Patents and Trademarks